(12) United States Patent
Liu

(10) Patent No.: US 8,181,007 B2
(45) Date of Patent: May 15, 2012

(54) ELECTRONIC DEVICE AND METHOD FOR SECURE OPERATING SYSTEM UPDATE IN EMBEDDED SYSTEM

(76) Inventor: Fengche Liu, Taipei (TW)

( * ) Notice: Subject to any disclaimer, the term of this patent is extended or adjusted under 35 U.S.C. 154(b) by 551 days.

(21) Appl. No.: 12/379,842

(22) Filed: Mar. 3, 2009

(65) Prior Publication Data

US 2010/0180108 A1    Jul. 15, 2010

(30) Foreign Application Priority Data

Jan. 14, 2009    (TW) .............................. 98101296 A

(51) Int. Cl.
*G06F 9/24* (2006.01)
(52) U.S. Cl. .................................. 713/2; 713/1; 717/173
(58) Field of Classification Search .................. 713/1, 2; 717/173
See application file for complete search history.

(56) References Cited

U.S. PATENT DOCUMENTS

| | | | |
|---|---|---|---|
| 5,987,605 A * | 11/1999 | Hill et al. ............................ | 713/2 |
| 6,615,404 B1 * | 9/2003 | Garfunkel et al. ............ | 717/173 |
| 7,356,677 B1 * | 4/2008 | Rafizadeh ......................... | 713/1 |

FOREIGN PATENT DOCUMENTS

| | | |
|---|---|---|
| TW | I227898 | 2/2005 |
| TW | I229818 | 3/2005 |

* cited by examiner

*Primary Examiner* — Thuan Du
(74) *Attorney, Agent, or Firm* — Chun-Ming Shih

(57) ABSTRACT

An electronic device and method for secure embedded operating system update within embedded system. The embedded system includes a random-access memory, a non-volatile storage unit and a processing unit. The non-volatile storage unit defines a boot sector, a first sector and a second sector and contains a boot loader in the boot sector, an initialization variable in the boot sector and an embedded operating system in the first sector. The second sector is provided for storing another embedded operating system. The processing unit is coupled to the random-access memory and the non-volatile storage unit and is capable of executing the boot loader in order to copy one of the embedded operating systems from either the first sector or the second sector of the non-volatile storage unit into the random-access memory according to the current value of the initialization variable and then executing the loaded embedded operating system.

3 Claims, 5 Drawing Sheets

ELECTRONIC DEVICE AND METHOD FOR SECURE OPERATING SYSTEM UPDATE IN EMBEDDED SYSTEM

BACKGROUND OF INVENTION

1. Field of Invention

The present invention relates generally to an electronic device with an embedded system therein, and more particularly to an embedded device and method for secure firmware update in embedded system.

2. Related Prior Art

Many commercial systems and consumer products rely on embedded systems to perform their functions. Embedded systems often take the form of general purpose microprocessors or microcontrollers to carry out specialized functions by firmware, such as an embedded operating system stored in a nonvolatile memory. In many cases, the firmware may be updated to fix defects or to introduce new features. However, such updates carry a risk—if for some reason, such as power outage, download failure or incomplete download, both the original and the new version embedded operating systems can work no more, which causes the embedded system to cease to operate properly. Typically, such a failure is difficult to correct because the embedded system ceases communicating.

Taiwan Patent No. 1229818 discloses an apparatus and a method for keyboard controller firmware update. In order to allow secure update without computer system shutdown or the operating system software ruined, the system works on several programs simultaneously—the so-called "Multi-Tasking"—the executing kernel of the computer, the processor, jumps from task to task to update firmware.

Additionally, Taiwan Patent No. 1227898 discloses an apparatus and a method for CD-ROM drive firmware update. In order to avoid the processor from ceasing to operate, the value of the program counter of the CD-ROM drive is reset once the update process is complete.

The abovementioned prior arts are intended to secure update through different techniques. However, there are still some uncontrollable conditions, such as power outage, that these existing update methods do not adequately insure against the risk of failure, and therefore are not suitable for embedded systems.

SUMMARY OF INVENTION

Broadly stated, the present invention is directed to an electronic device and method for firmware update in an embedded system thereof. The embedded system comprises a processing unit, a random-access memory, and a non-volatile storage unit. The processing unit is coupled to the random-access memory and the non-volatile storage unit. The non-volatile storage unit is partitioned into a boot sector, a first sector and a second sector. And, the non-volatile storage unit contains a boot loader in the boot sector, an initialization variable in the boot sector and an embedded operating system in the first sector. The second sector of the non-volatile storage unit is provided for storing another embedded operating system. The processing unit is capable of instructing the boot loader to perform an operating system loading process and then instructing the loaded embedded operating system to operate on the electronic device. The operating system loading process includes the steps of checking the current value of the initialization variable; and copying the embedded operating system from the first sector of the non-volatile storage unit into the random-access memory if the initialization variable is set at a first value, and copying the embedded operating system from the second sector of the non-volatile storage unit into the random-access memory if the initialization variable is set at a second value.

Preferably, the embedded system further comprises an update program capable of performing an upgrade process. The upgrade process includes the steps of determining whether a new version of an embedded operating system is available on a server for download; checking the current value of the initialization variable if the new version the embedded operating system is available. If the initialization variable is set at the first value, overwrite the new-version embedded operating system into the second sector of the non-volatile storage unit, check whether the overwrite is complete, and then reset the initialization variable to the second value only if the overwrite is complete. If the initialization variable is set at the second value, overwrite the new-version embedded operating system into the first sector of the non-volatile storage unit, check whether the overwrite is complete, and then reset the initialization variable to the first value only if the overwrite is complete.

The present invention and the advantages thereof will become more apparent upon consideration of the following detailed description when taken in conjunction with the accompanying drawings.

BRIEF DESCRIPTION OF DRAWINGS

For a detailed description of illustrative embodiments of the invention, reference will now be made to the accompanying drawings in which.

DETAILED DESCRIPTION OF EMBODIMENTS

Figure 1:
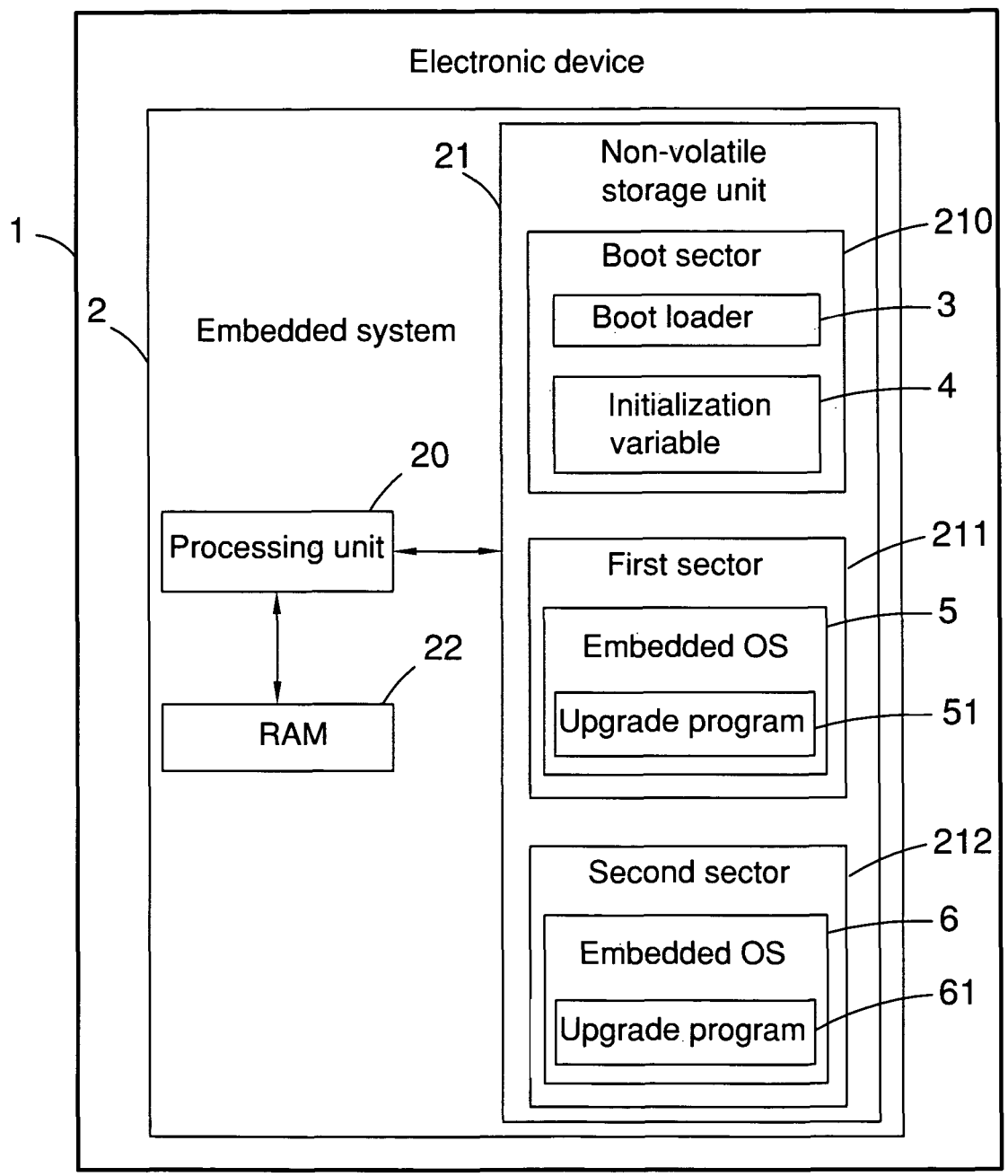
FIG. 1 is a general block diagram illustrating the invented electronic device in its first embodiment.

Referring now to FIG. 1, an electronic device 1 according to a first embodiment of the present invention is disclosed. The electronic device 1 is installed with an embedded system 2 created for a specific task. Examples include i Pods, remote controls, cell phones, e-book, broadband IP sharing router, mobile internet device and most any electronic application one can imagine.

The embedded system 2 of the electronic device 1 includes a processing unit 20, a non-volatile storage unit 21 and a random-access memory (hereinafter RAM) 22. The non-volatile storage unit 21 is coupled to the processing unit 20 and the RAM 22 is coupled to the processing unit 20 as well. Generally, the embedded system 2 further includes an I/O interface (not shown) and one or more application-specific integrated circuit (ASIC, not shown). The I/O interface includes keyboard interface, monitor interface, USB interface, IEEE-1394 interface, Internet interface, IrDA interface, Bluetooth interface and so on. The ASIC is an integrated circuit (IC) customized for a particular use, rather than intended for general-purpose use. For example, a chip designed solely to run a cell phone is an ASIC. The embedded system 2 includes other related controlling units, which are well-known in the arts and will not be discussed further here.

The processing unit 20 may be an embedded microprocessor unit (EMPU), an embedded microcontroller unit (MCU), an embedded digital signal processor (EDSP), an embedded system on chip (ESOC) or suchlike. Broadly speaking, the processing unit 20 may include one or more other special purpose processor cores according to the requirement of the embedded system 2.

Referring again to FIG. 1, the non-volatile storage unit 21 is computer memory that can retain the stored information even when not powered. Examples include read-only memory (ROM), Electrically Erasable Programmable Read-Only Memory (EEPROM), flash memory or its combination. In particular, the non-volatile storage unit 21 is partitioned into a boot sector 210, a first sector 211 and a second sector 212. The non-volatile storage unit 21 contains a boot loader 3 and an initialization variable 4 in the boot sector 210. The initialization variable 4 may be set to either a first value or a second value. Additionally, the non-volatile storage unit 21 contains an embedded operating system (Embedded OS) 5 in the first sector 211 and another embedded operating system 6 in the second sector 212. It should be noted that in the beginning when the electronic device 1 is brand new and the embedded system 2 has never been upgraded ever, the second sector 212 of the non-volatile storage unit 21 may be filled with no embedded operating system 6, but an empty space. It is after an upgrade process, which will be discussed in detail hereinafter, the embedded operating system 6 is overwritten into the second sector 212, as shown in FIG. 1.

When the electronic device 1 is powered on or reset to restart, the processing unit 20 instructs the boot loader 3 to perform an operating system loading process and then starts up the loaded embedded operating system 5. The boot loader 3 is capable of performing an initialization process and the operating system loading process. The initialization process is intended to initialize the processing unit 20, the non-volatile storage unit 21, the RAM 22, the I/O interface and the ASIC and perform a POST (Power-On Self-Test) to insure that it meets the necessary system requirements and that all hardware is working. The operating system loading process is usually the last step which the boot loader 3 may perform and is directed to copy the embedded operating system from either the first sector 211 or the second sector 212 of the non-volatile storage unit 21 into the RAM 22 and then ask the embedded operating system 5 to take control.

Figure 2:
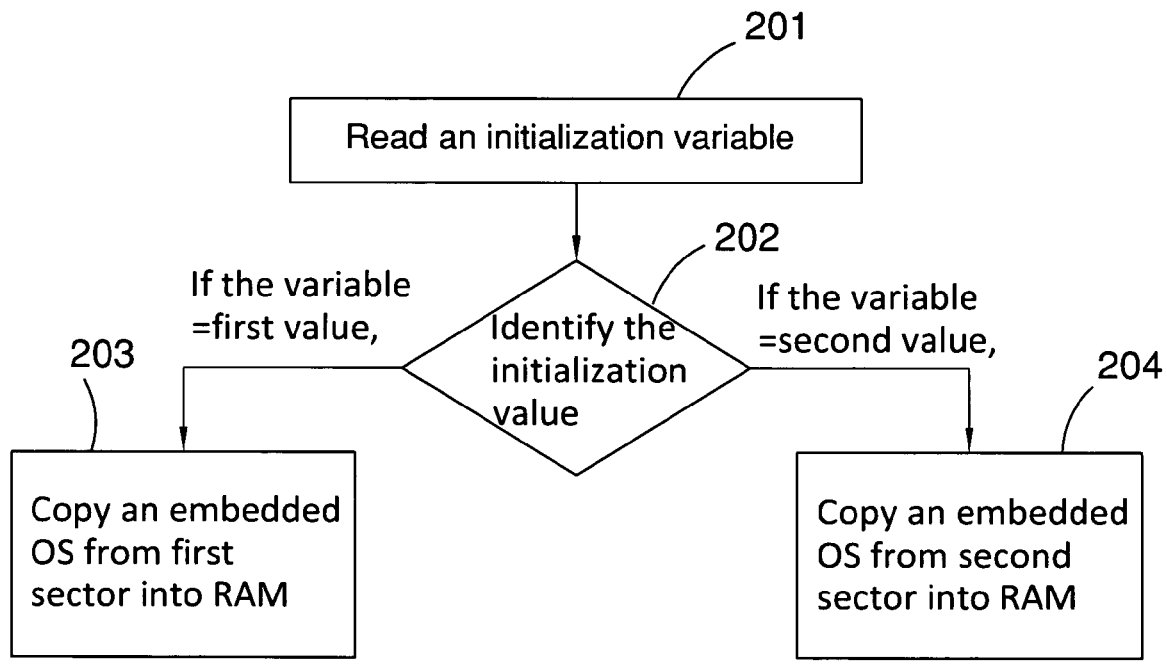
FIG. 2 is a flow diagram illustrating an operating system loading process performed by the boot loader of FIG. 1.

FIG. 2 is a flow diagram showing the operating system loading process, which includes the following steps. First, the boot loader 3 reads the initialization variable 4 (block 201) to check and identify the current value of the initialization variable 4 (block 202). If the initialization variable 4 is set at the first value, copy the embedded operating system 5 from the first sector 211 of the non-volatile storage unit 21 into the RAM 22 (block 203). If the initialization variable 4 is set at the second value, copy the embedded operating system 6 from the second sector 212 of the non-volatile storage unit 21 into the RAM 22 (block 204). In this embodiment, since the initialization variable is pre-set at the first value, the boot loader 3 will copy the embedded operating system 5 from the first sector 211 of the non-volatile storage unit 21 into the RAM 22 once the electronic device 1 is booted at the first time.

Different from the conventional boot loader, the boot loader 3 performs the operating system loading process according to the current value of the initialization variable 4. As such, the embedded operating system may come from either the first sector 211 or the second sector 212, depending on the current valve of the initialization variable 4. Accordingly, when the electronic device 1 is booted at the first time, the initialization variable 4 is set at the pre-set first value so that the loaded embedded operating system 5 in the first sector 211 of the non-volatile storage unit 21 will be copied into the RAM 22.

The embedded operating system 5 includes an upgrade program 51 which is configured to detect whether a new-version embedded operating system available for download and further download the same. As mentioned earlier, if the embedded system 2 has never been upgraded, the second sector 212 of the non-volatile storage unit 21 is empty. It is after the upgrade process is done via the upgrade program 51 of the embedded operating system 5 that the embedded operating system 6 is then downloaded and overwritten into the second sector 212 of the non-volatile storage unit 21.

Figure 3:
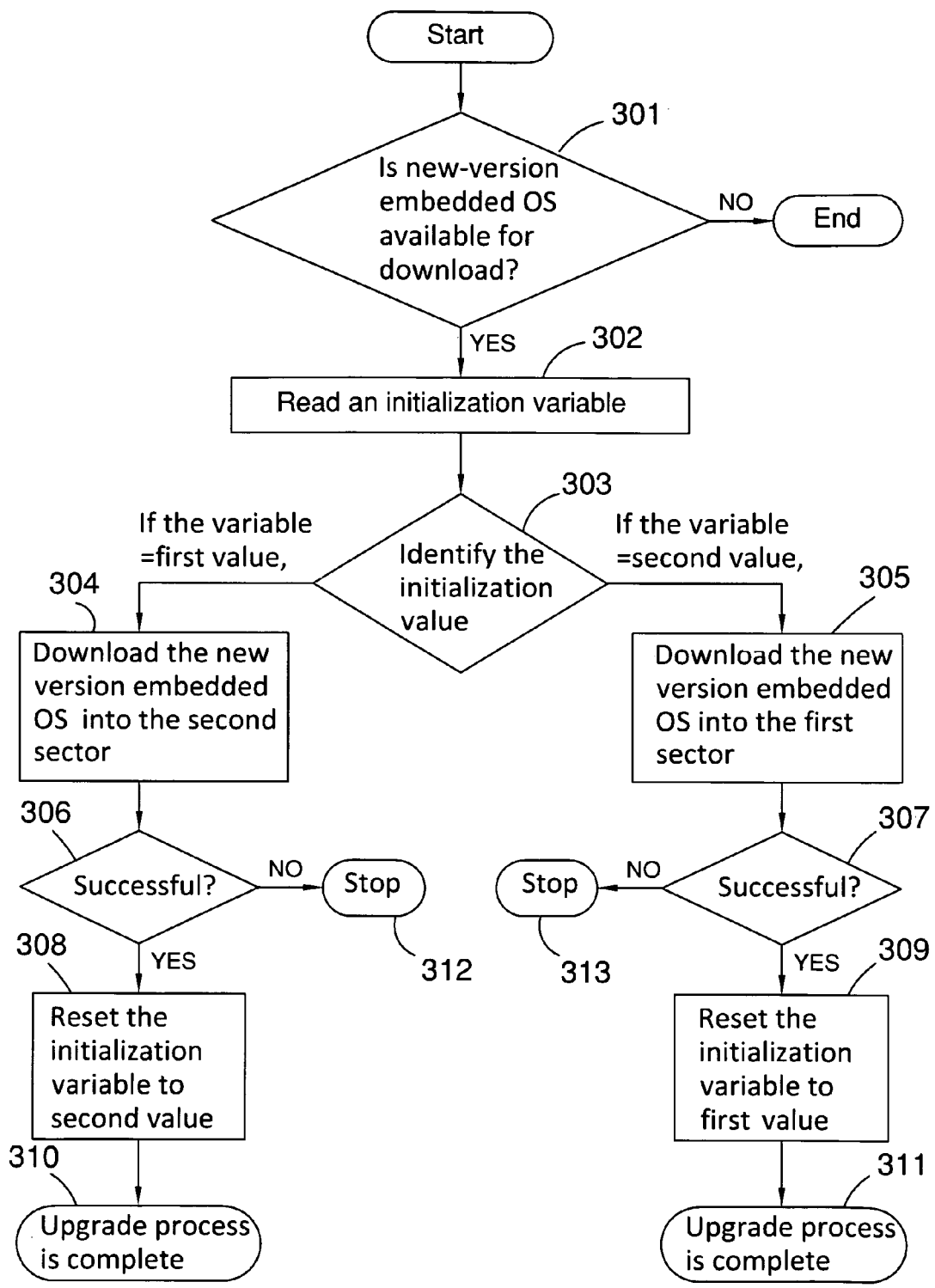
FIG. 3 is a flow diagram illustrating an upgrade process performed by the embedded operating system of FIG. 1.

FIG. 3 is a flow diagram showing the upgrade process, which includes the steps of determining whether new version of an embedded operating system is available on a server for download (block 301), and if available, reading the initialization variable 4 (block 302) and identifying the current value of the initialization variable 4 (block 303). If the initialization variable 4 is set at the first value, the new-version embedded operating system will be downloaded and overwritten into the second sector 212 of the non-volatile storage unit 21 (block 304). However, if the new version embedded operating system is not available, the upgrade process comes to an end. Next, the upgrade program 51 will check whether the download is successful (block 306). If the download is confirmed successful, the initialization variable 4 will be reset to the second value (block 308) and the upgrade process is complete (block 310). However, if for some reasons the download is interrupted and not successful, the upgrade process will be stopped (block 312). On the other hand, if the initialization variable 4 is set at the second value, the new-version embedded operating system will be downloaded and overwritten into the first sector 211 of the non-volatile storage unit 21 (block 305). Then, the upgrade program 51 will check whether the download is successful (block 307). If the download is confirmed successful, the initialization variable 4 will be reset to the first value (block 309) and the upgrade process is complete (block 311). However, if for some reasons the download is interrupted and not successful, the upgrade process will be stopped (block 313).

Unlike the conventional upgrade program, the upgrade program 51 according to the present invention downloads the new version embedded operating system from the server into the unused sector, may be the first sector 21 or the second sector 22, according to the current value of the initialization variable 4 and reset the initialization variable 4 to the other value only when the download is confirmed complete. Reset of the initialization variable 4 after download enables the boot loader 3, for the next reboot, to copy the latest embedded operating system from the other sector of the non-volatile storage unit 21 into the RAM 22, instead of from the current sector.

Specifically, in the first embodiment, the electronic device 1 is booted at the first time, the initialization variable 4 is pre-set at the first value and the new version embedded operating system is available on the server for download. Under such conditions, the upgrade program 51 of the embedded operating system 5 performs the upgrade process to download the new version embedded operating system from the server into the second sector 212 of the non-volatile storage unit 21, rather than the current first sector 211. That is, at this time, the embedded operating system 6 of FIG. 1 is the new version. Next, when the download is complete, the initialization variable 4 will be reset to the second value, instead of the original first value, which causes the boot loader 3 of the electronic device 1 to copy the new version embedded operating system 6 from the second sector 212, rather than the original embedded operating system 5 from the first sector 211, when the electronic device 1 is re-booted. It is therefore, once the new version embedded operating system is downloaded, the electronic device 1 can be rebooted to run the new version for operation. However, if the download fails for any reason, the upgrade process will stop and the initialization variable 4 will remain at the first value. The boot loader 3 will remain copying the embedded operating system 5 from the first sector 211 into the RAM 22 for further operation so that the electronic device 1 can still work properly. It is noted that the new version embedded operating system 6 includes also an upgrade program 61 identical to the upgrade program 51 of the embedded operating system 5 so that the upgrade program 61 may download a newer version embedded operating system (not shown) in the future.

As illustrated above, under cooperation of the boot loader 3, the upgrade program 51 and the initialization variable 4, once the electronic device 1 is booted, the boot loader 3 will copy the relatively new embedded operating system from either the first sector 211 or the second sector 212 of the non-volatile storage unit 21 into the RAM 22 for further operation. Also, the new version embedded operating system will execute the upgrade process to download a newer version embedded operating system in the future. As such, upon booted, the electronic device 1 will definitely run the latest version embedded operating system. In particular, the upgrade program 51 downloads the new version embedded operating system into the unused sector of the non-volatile storage unit 21, which may be the first sector 1 or the second sector, rather than into the current used sector. In such a manner, even if the download fails, the current/original embedded operating system will remain the same without being damaged so that when the electronic device 1 is re-booted, the original embedded operating system can still be used and function well for further operation.

Figure 4:
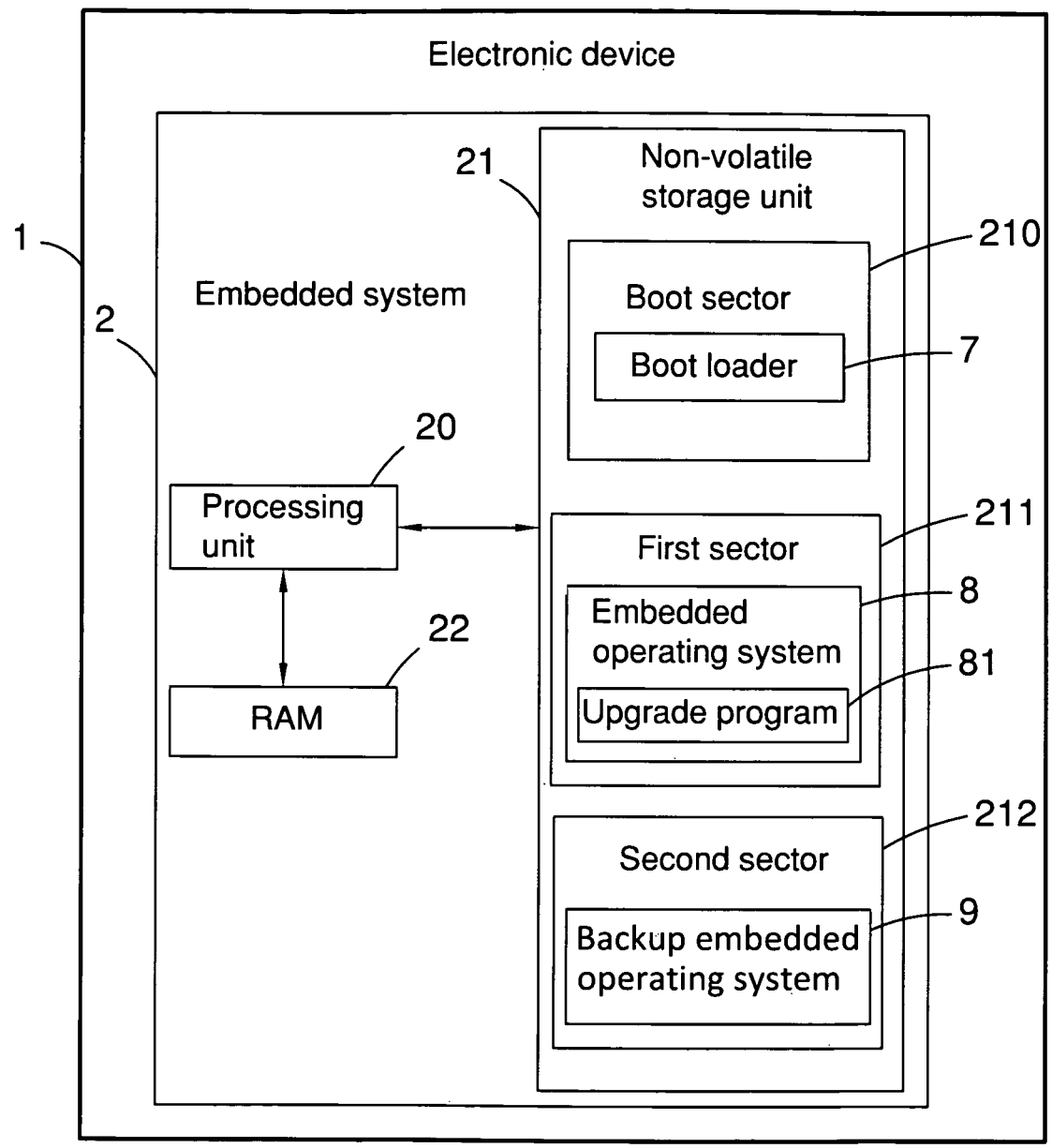
FIG. 4 is a general block diagram illustrating the invented electronic device in its second embodiment.
Figure 5:
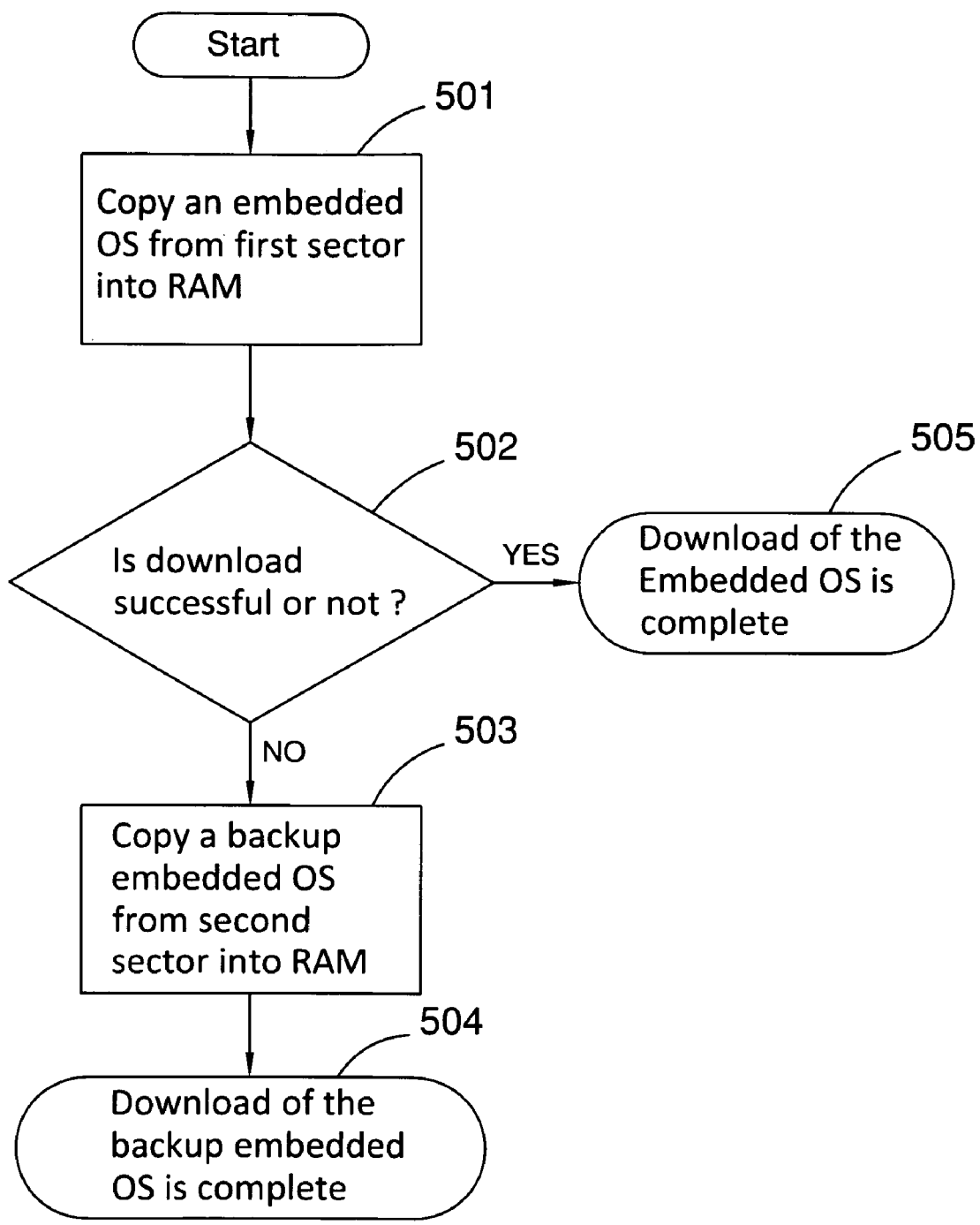
FIG. 5 is a flow diagram illustrating an operating system loading process performed by the boot loader of FIG. 4.

With reference to FIGS. 4 and 5, an electronic device 1 in accordance with a second embodiment of the invention is illustrated. Similar to the first embodiment, the embedded system 2 of the second embodiment includes a processing unit 20, a RAM 22 and a non-volatile storage unit or memory 21 partitioned into a boot sector 210, a first sector 211 and a second sector 212, except that the first sector 211 is stored with an original embedded operating system 8 and the second sector 212 is stored with a backup embedded operating system 9. In particular, the original and the backup embedded operating systems 8, 9 are programmed into the first and second sectors respectively by the manufacturer in advance. Moreover, the original and the backup embedded operating systems 8, 9 are the same version in the beginning. However, the embedded operating system 8 in the first sector 211 will be updated to the latest version time after time while the backup embedded operating system 9 will remain the same from beginning to end.

FIG. 5 is a flow diagram showing an operating system loading process performed by the boot loader 7, including the following steps: First, the boot loader 7 copies the embedded operating system 8 from the first sector 211 into the RAM 22 (block 501) and then check whether the embedded operating system 8 is successfully loaded in the RAM 22 (block 502). If yes, the operating system loading process is complete (block 505), and the electronic device 1 will use the embedded operating system 8 for further operation. However, if for some reasons the loading process is interrupted and the embedded operating system 8 is not successfully loaded in the RAM 22, the boot loader 7 will immediately copy the backup embedded operating system 9 from the second sector 212 of the non-volatile storage unit 21 into the RAM 22 (block 503) and the operating system loading process is complete (block 504). It is therefore that the electronic device 1 can still function well with the help of the backup embedded operating system 9 without shutdown.

Furthermore, the embedded operating system 8 includes an update program 81. Each time when the embedded operating system 8 is loaded into the RAM 22, the embedded operating system 8 will instruct the update program 81 to execute an update process. The update program 81 of the embedded operating system 8 can detect whether new version embedded operating system is available on a server. If available, the new version will be downloaded and overwritten into the first sector 211, not the second sector 212 as described in the first embodiment. In other words, the new version replaces the old version embedded operating system 8 in the first sector 211. It is noted that the new version embedded operating system also includes an update program 51a to repeat the upgrade process in the future.

As disclosed above, each time the latest embedded operating system is downloaded and overwritten into the first sector 211 of the non-volatile storage unit 21 rather than into the second sector 212. The backup embedded operating system 9 has not been changed and is as good as new. Once the update process fails and the original version 8 is ruined, the backup embedded operating system 9 can be take over the job to make sure that the electronic device 1 can still be booted successfully.

As shown in the abovementioned embodiments, the electronic device according to present invention can auto-upgraded itself with new version embedded operating system, and even if the upgrade process fails, the electronic device can still be successfully booted and function well.

It will be appreciated that although a particular embodiment of the invention has been shown and described, modifications may be made. It is intended in the claims to cover such modifications which come within the spirit and scope of the invention.

The invention claimed is:

1. An electronic device having an embedded system therein, said embedded system comprising:
   a random-access memory;
   a non-volatile storage unit defining a boot sector, a first sector and a second sector and containing a boot loader in said boot sector, an initialization variable in said boot sector and an embedded operating system in said first sector, wherein said second sector is provided for storing another embedded operating system;
   a processing unit coupled to said random-access memory and said non-volatile storage unit and being capable of instructing said boot loader to perform an operating system loading process and instructing said loaded embedded operating system to operate on the electronic device; wherein said operating system loading process includes the following steps:
   (a). checking the current value of said initialization variable; and
   (b). copying said embedded operating system from said first sector of said non-volatile storage unit into said random-access memory if said initialization variable is set at a first value, and copying said embedded operating system from said second sector of said non-volatile storage unit into said random-access memory if said initialization variable is set at a second value; and
   an update program configured to perform an upgrade process including the following steps:

(a). determining whether a new version embedded operating system is available on a server for download;
(b). checking a current value of said initialization variable if said new version embedded operating system is available;
(c). if said initialization variable is set at said first value, overwriting said new-version embedded operating system into said second sector of said non-volatile storage unit, and then resetting said initialization variable to said second value only when said overwrite is complete; and
(d). if said initialization variable is set at said second value, overwriting said new-version embedded operating system into said first sector of said non-volatile storage unit, and then resetting said initialization variable to said first value only when said overwrite is complete.

2. An electronic device comprising:
a random-access memory (RAM);
a non-volatile memory (NVM) having an initialization variable stored therein;
a first operating system installed in the NVM;
a second operating system installed in the NVM;
a boot loader stored in the NVM, and wherein the boot loader is operable to load the first operating system into the RAM if the initialization variable is set at a first value, and to load the second operating system into the RAM if the initialization variable is set at a second value; and
an update program configured to update the first operating system if the initialization variable is set at the first value and reset the initialization variable to the second value only when the update of the first operating system is complete, and to update the second operating system if the initialization variable is set at the second value and reset the initialization variable to the first value only when the update of the second operating system is complete.

3. A method for updating programmable information in an electronic device, comprising the following steps:
(a). retrieving a current value of a variable stored in a non-volatile memory (NVM);
(b). if the current value is a first value, downloading updated information into a first sector of the NVM, and resetting the variable to a second value only when it is judged that the download into the first sector is complete; and
(c). if the current value is a second value, downloading updated information into a second sector of the NVM; and resetting the variable to the first value only when it is judged that the download into the second sector is complete.

* * * * *